United States Patent [19]
Hedberg

[11] 4,382,171
[45] May 3, 1983

[54] ARC WELDING CURRENT SUPPLY

[75] Inventor: John B. G. Hedberg, Hanover, N.H.

[73] Assignee: Thermal Dynamics Corporation, West Lebanon, N.H.

[21] Appl. No.: 188,793

[22] Filed: Sep. 19, 1980

Related U.S. Application Data

[60] Continuation-in-part of Ser. No. 891,804, Mar. 30, 1978, abandoned, which is a division of Ser. No. 795,501, May 10, 1977, abandoned.

[30] Foreign Application Priority Data

May 12, 1976 [GB] United Kingdom ............... 19532/76

[51] Int. Cl.³ .............................................. B23K 9/10
[52] U.S. Cl. .................................. 219/130.1; 363/136
[58] Field of Search ........... 219/130.1, 130.21, 130.31, 219/130.33, 130.51; 363/37, 135, 136, 96

[56] References Cited

U.S. PATENT DOCUMENTS 3,728,516  4/1973  Daspit ............................ 219/130.33
3,814,888  6/1974  Bowers et al. ...................... 363/136

FOREIGN PATENT DOCUMENTS 2325793  12/1974  Fed. Rep. of Germany ....................... 219/130.31

*Primary Examiner*—C. C. Shaw
*Attorney, Agent, or Firm*—Majestic, Gallagher, Parsons & Siebert

[57] ABSTRACT

An a.c. operated arc welding current supply unit comprises a frequency converter of the series capacitor type and operating with a half period which is substantially less than the average duration of the current and voltage transients caused by short circuits through droplets of weld material during welding. The frequency converter is connected to welding electrodes through a transformer in series with a rectifier to provide direct current for the welding electrodes, and the frequency converter is associated with a control device for maintaining the operating frequency of the converter constant, thereby maintaining the arc power substantially unchanged irrespective of changes in load caused by the welding operation.

7 Claims, 3 Drawing Figures

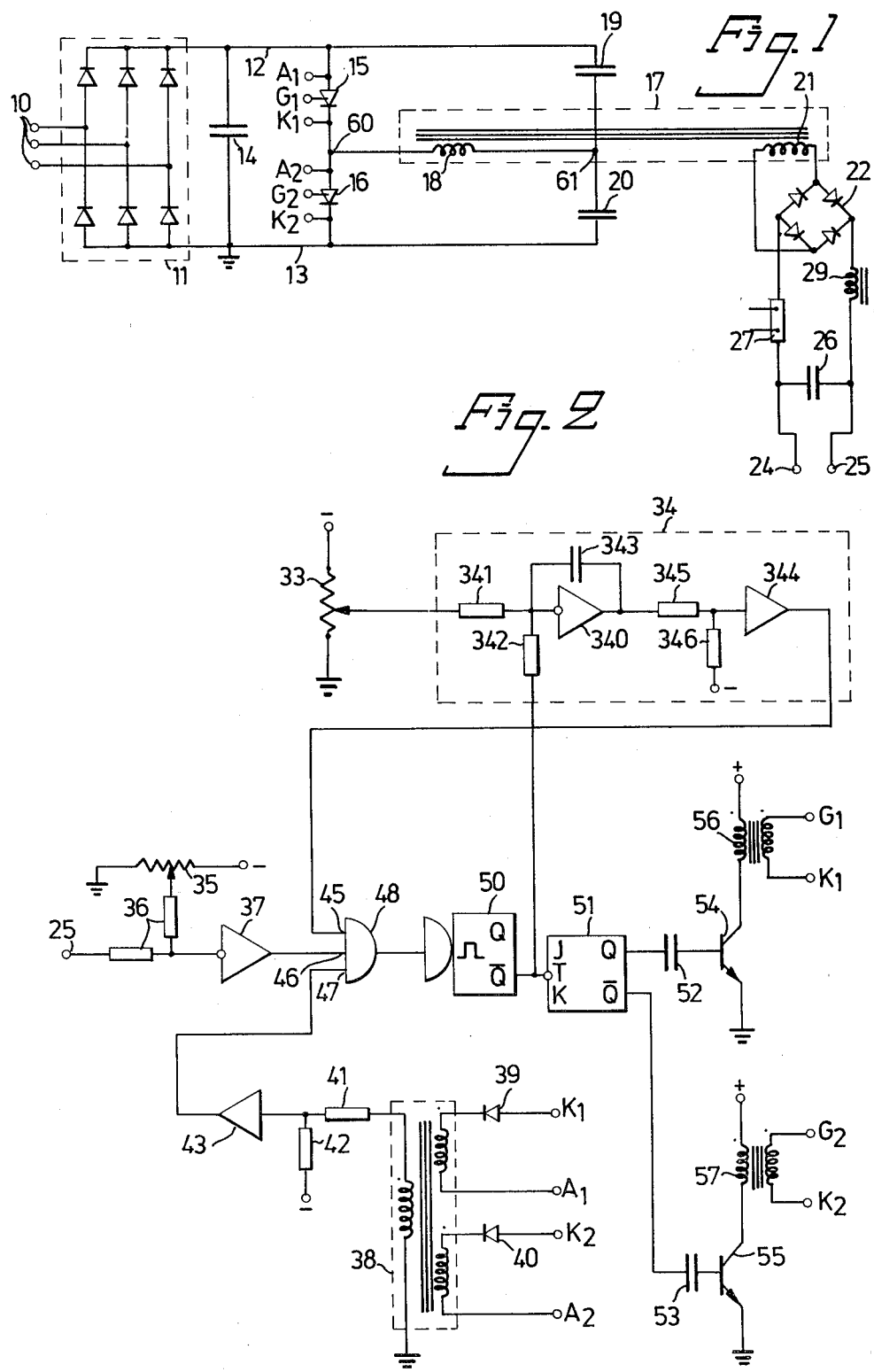

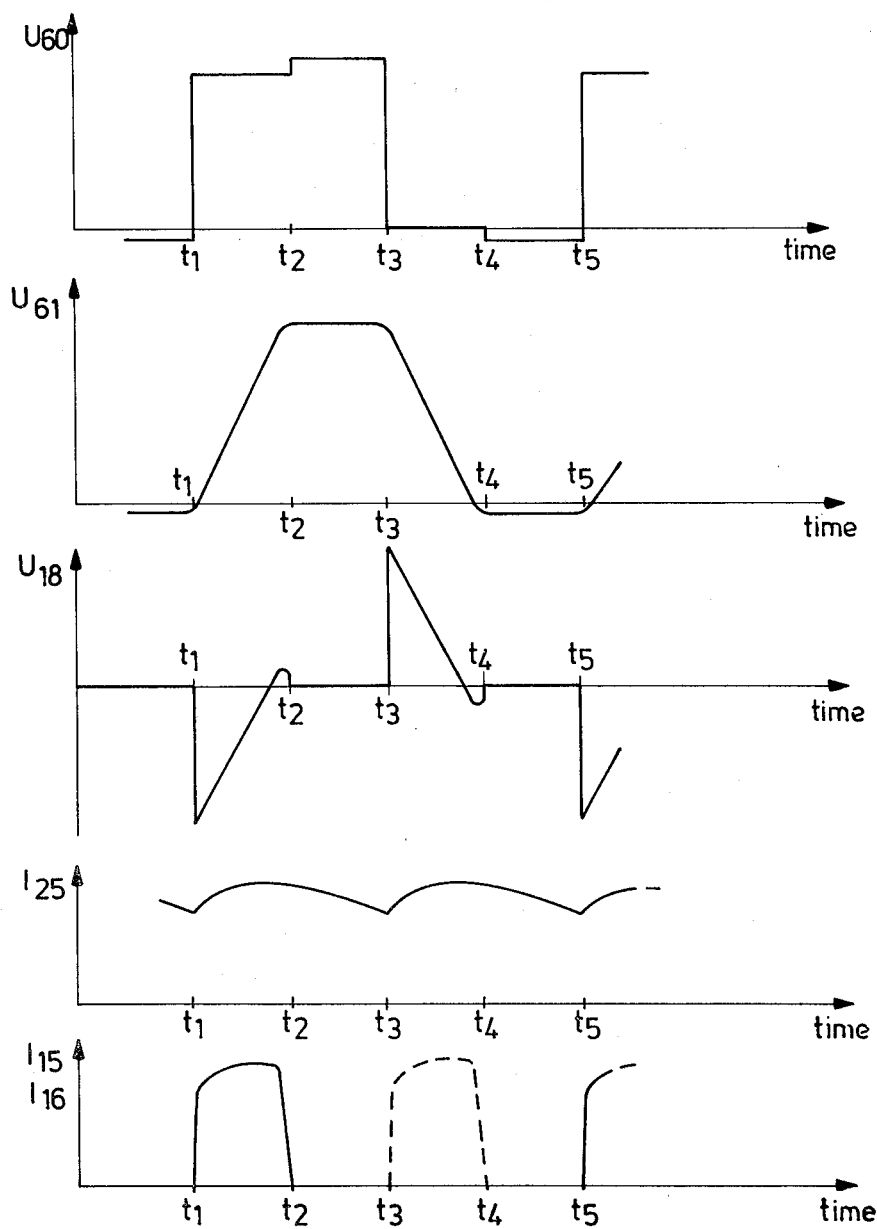

ARC WELDING CURRENT SUPPLY

This application is a continuation-in-part of application Ser. No. 891,804, filed Mar. 30, 1978 now abandoned, which is a divisional application of Ser. No. 795,501, filed May 10, 1977 abandoned.

The present invention relates to an arc welding current supply unit which is arranged to be fed with alternating current and to provide direct current for welding electrodes.

An object of the invention is to provide a novel and useful welding current supply unit which will facilitate welding operations so that an acceptable weld can be made by relatively unskilled persons and which will also enable more satisfactory welding operations to be carried out than was hitherto possible, with the use of conventional welding current units operating at main frequencies.

To this end it is suggested in accordance with the invention that an arc welding current supply unit of the aforementioned type includes a controlled frequency converter operating with a half-period which is less than the average duration of the current and voltage transients caused by short circuits through droplets of the weld material, e.g. less than 3 milliseconds and preferably less than 1.5 milliseconds, and adapted to be connected to the welding electrodes through a transformer in series with a rectifier, and also includes a control device which is adapted to control the converter in a manner such that the arc power remains substantially unchanged irrespective of changes in load caused by the welding operation, wherein said converter is of the series-capacitor type, i.e., the primary winding of the transformer is supplied from a d.c. voltage intermediate stage by controlled alternating discharge of one or more capacitors connected in series with said primary winding, and wherein the control device is adapted to maintain the operating frequency of the converter constant.

With such a welding current supply unit there is obtained a particularly stable and quiescent arc, irrespective of small variations in the distance between electrode and work piece. In addition, in the event of a short circuit caused by droplets of welding material, the arc will be smoothly re-ignited with small dynamic effect on the molten material.

So that the invention will be more readily understood and optional features thereof made apparent, an embodiment thereof will now be described with reference to the accompanying schematic drawings in which:

FIG. 1 is a circuit diagram of an a.c. operated arc welding current supply unit having a frequency converter of a type which can be used to advantage in conjunction with the present invention;

FIG. 2 is a circuit diagram of a control circuit intended for use with the current supply unit of FIG. 1;

FIG. 3 illustrates curves denoting voltages and currents which occur during the normal operation of the current supply unit.

The current supply unit shown in FIG. 1 is connected at 10 to a 3-phase a.c. network. The input current is rectified to a six-element full-wave rectifier 11, the rectified output voltage on lines 12, 13 being smoothed by a buffer capacitor 14 and applied to a frequency converter having—as a consequence of the shown arrangement of elements 11 to 14—a low input impedance.

With the illustrated embodiment the switching elements of the frequency converter comprise thyristors 15, 16 which are controlled so as to be alternately energized. The frequency converter is associated with a transformer generally shown at 17 and the primary winding 18 of which is connected in series with load capacitors 19, 20 forming parts of the frequency converter. The secondary winding 21 of the transformer 17 is connected via a bridge rectifier 22 and a choke 29 to welding electrode terminals 24, 25, which terminals are capable of being connected to a welding electrode holder and a work piece to be welded. With the illustrated embodiment there is connected between the terminals 24, 25 a capacitor 26 which is used to maintain a desired open-circuit voltage. A shunt 27 may also be arranged for measuring the load current.

In FIG. 2, there is shown a control device which is adapted to control the frequency converter in a manner such that the arc power remains substantially constant irrespective of changes in load caused by the welding operation. This control device includes a power adjustment device which comprises a potentiometer 33 which is connected between a fixed negative voltage source and earth and which potentiometer is adapted to control an oscillator 34. The oscillator 34 includes an integrating circuit comprising an amplifier 340, resistors 341 and 342, and a capacitor 343. The oscillator also includes a level discriminator 344 with associated comparison resistors 345, 346, the resistor 345 being connected to the output of the integrating circuit and the resistor 346 being connected to a voltage source having a fixed negative voltage. The amplifier 340 is controlled in the positive sense by a control signal from the potentiometer 33 and in the negative sense by signals from the $\overline{Q}$-output of a monostable flip-flop 50 hereinafter described. A voltage adjuster 35 in the form of a potentiometer is provided for adjusting the desired maximum output voltage from the current supply unit, which voltage adjuster 35 is connected via comparison resistors 36 to the terminal 25 of the current supply unit and to an amplifier 37 which serves as a level discriminator.

Control of the state of the thyristors 15, 16 is effected by means of a sensing circuit comprising a transformer 38, the primary side of which is connected via diodes 39, 40 to the anodes $A_1$, $A_2$ and cathodes $K_1$, $K_2$ of the thyristors 15, 16. One end of the secondary winding of the transformer 38 is earthed and the other end is connected to a comparison circuit which comprises two resistors 41, 42, the resistor 42 having one end thereof connected to a constant negative voltage. The junction between the resistors 41, 42 is further connected to an amplifier 43 which serves as a level discriminator and the change-over point of which is determined by the resistors 41, 42 and the aforementioned constant negative voltage. Each of the amplifiers 344, 37 and 43 is connected to a respective input 45, 46, 47 of an AND gate 48, which operates in a known manner. Thus, in order for the AND gate 48 to emit an output signal, it is necessary for the output signal obtained from the amplifier 344 to be positive. Correspondingly it is necessary for the output signal from the amplifier 37 to be positive, i.e. for the load voltage on the terminal 25 to be less than the value for which the adjuster 35 is set. Finally, the output signal from the amplifier 43 must be positive, which means that the anode voltage of one of the thyristors 15 or 16 is negative in relation to the cathode, which in turn means that both the thyristors 15 and 16 are de-energized.

The output of the AND gate 48 is connected to the input of the monostable flip-flop 50 which has a predetermined pulse period corresponding to the recovery time of the thyristors 15, 16, for example 30 us. Thus, on the output $\overline{Q}$ of the flip-flop 50 there is obtained a positive voltage pulse for a period of time corresponding to the recovery time of the thyristors 15, 16. This pulse is transmitted through the resistor 342 to the amplifier 340 and is also transmitted to the trigger input T of a JK flip-flop 51, so that the JK flip-flop 51 changes the status of its outputs at the end of the pulse obtained from the flip-flop 50. The outputs Q, $\overline{Q}$ of the JK flip-flop 51 are connected to the base electrodes of respective transistors 54, 55 via capacitors 52, 53. The emitters of the transistors 54, 55 are connected to earth while their collectors are connected to the primary windings of respective ignition transformers 56, 57 for the thyristors 15, 16. The other ends of the primary windings are connected to a terminal having a pre-determined positive potential, and the ends of the secondary windings are connected to the cathode $K_1$ or $K_2$ and the gate $G_1$ or $G_2$ of a respective thyristor 15 or 16. The signals from the outputs of the JK flip-flop 51 will alternatively render the transistors 54, 55 conductive via the capacitors 52, 53 for a short period of time determined by the capacitors 52, 53, so that the thyristors 15, 16 alternately receive a short ignition pulse and thereby alternately supply current to the primary winding 18 of the transformer 17 to produce an alternating current whose frequency is determined by the signals on the inputs 45, 46, 47 of the AND gate 48. With this arrangement a desired frequency of the oscillator 34 and hence a desired arc power can be set solely by a corresponding adjustment of the potentiometer 33.

FIG. 3 shows the voltages $U_{60}$, $U_{61}$ at points 60, 61 and the voltage $U_{18}$ across the primary winding 18 of the transformer 17 with normal load on the output of the current supply unit shown in FIGS. 1 and 2. FIG. 3 also shows the output current $I_{25}$ through the terminal 25 and the output currents $I_{15}$ and $I_{16}$ (the latter shown in dash lines) from the thyristors 15, 16. In FIG. 3 the reference $t_1$ illustrates the point of time when the thyristor 15 is ignited, $t_2$ the point of time when the thyristor 15 is de-energized and obtains a negative voltage between the anode $A_1$ and cathode $K_1$ as a result of the resonant circuit formed by the primary winding 18 of the transformer 17 and the capacitors 19, 20, $t_3$ the point of time when the thyristor 16 is ignited, and $t_4$ the point of time when the thyristor 16 is de-energized and obtains a negative anode voltage as a result of said resonant circuit 18, 19, 20. The reference $t_5$ shows the point of time at which the thyristor 15 is re-ignited, whereupon the sequence is repeated provided that the load remains substantially unchanged.

Referring to FIGS. 1, 2 and 3 together, it can be seen that the circuit shown provides constant power to the weld by alternately switching on thyristors 15 and 16 at a constant frequency determined by the setting of the potentiometer 33. Each time a thyristor is turned on, a voltage equal to the d.c. voltage on line 12 is supplied to one of the capacitors 19 and 20. Thus, there is a fixed or constant amount of energy stored on each capacitor at the end of each half cycle. Since each capacitor is fully discharged, as explained below, prior to each charging half cycle, there is a constant amount of energy supplied through the transformer during each half cycle. Increasing or decreasing the frequency, therefore, will increase the total power to the weld.

Of the three inputs to the AND gate 48, the input 45 from oscillator 34 determines the switching frequency for the thyristors 15 and 16. Input 46 is normally positive and will have no effect on the switching frequency. However, if the voltage to the weld at terminal 25 goes above a predetermined maximum, set by the potentiometer 35 and resistor 36, the input at terminal 46 will become negative thereby preventing further ignition of either thyristor until the voltage applied to the weld drops below the predetermined maximum. The input to terminal 47 also does not control the frequency of ignition of the thyristors. It simply insures that neither thyristor will be turned on until both thyristors are fully turned off. This is accomplished by connecting the two primaries of transformer 38, as shown, between the cathode and anode of the respective thyristors. As can be seen from FIG. 3, after the current through the conducting thyristor fully charges one of the capacitors 19 and 20, and concomitantly fully discharges the other capacitor, a small reverse bias is applied across the thyristor, as explained below. This fully turns off the formerly conducting thyristor. When the latter occurs the input 47 to AND gate 48 becomes positive and permits the next positive pulse from the oscillator 34 to initiate the ignition of the other thyristor.

The charging and discharging of capacitors 19 and 20 can be best understood by reference to the waveforms shown in FIG. 3. Assume that capacitor 20 is fully charged and that the time is just prior to $t_3$. The voltages at terminals 60 and 61 are equal and slightly higher than the voltages on line 12. A reverse bias appears across thyristor 15 and therefore thyristor 15 is turned off and no current is being conducted. At time $t_3$ the Q output of flip-flop 51 becomes positive, turning on transistor 55 for a short period of time determined by the capacitor 53. Current flows through the primary of coil 57 thereby providing an ignition pulse to the thyristor 16 for a short period of time sufficient to turn on thyristor 16. The impedance of thyristor 16 is substantially zero when it is conducting. Thus the voltage $U_{60}$ at terminal 60 immediately drops to ground. The voltage at terminal 61, however, cannot immediately drop to ground level because of the presence of inductance in the primary coil 18 and the capacitors 19 and 20. Capacitor 20 begins discharging through coil 18 and the thyristor 16. Also, capacitor 19 begins charging negatively at terminal 61. As seen from the waveforms, the voltage at terminal 61 reaches zero volts thereby indicating that the capacitor 20 is fully discharged. When capacitor 20 fully discharges, the voltage at terminal 61 is at ground. However, because of the inductance present in the transformer 17, there is energy stored therein, and the current cannot cease immediately. Thus, the current continues to flow for a very short period of time until the energy in the inductance is dissipated and transferred to the capacitor 20. This time is represented by the overswing of the voltage $V_{18}$ across the primary coil from the instant the capacitor 20 is discharged until time $T_4$. The continued flow of current during this short period actually puts an insubstantial reverse charge on capacitor 20 as can be seen from the slight negative voltage $V_{61}$ from $T_4$ to $T_5$. Thus, from $T_4$ to $T_5$, terminal 61 will have a slight negative voltage, the voltage $V_{18}$ across the primary will be zero, and a reverse bias will appear across the thyristor 16. It will be noted that the thyristor 16 is not cut off at any time during the discharging of the capacitor 20, but only after capacitor 20 has been fully discharged. The operation of the circuit when thyristor 15 is turned on is exactly the same except the functions of capacitors 19 and 20 are reversed and the voltage polarities are reversed from that previously described. Thus, it can be seen that since the capacitors 19 and 20 are alternately charged to the maximum voltage and fully discharged during each cycle, the amount of energy supplied during each cycle is constant and therefore a variation of the frequency varies the total amount of energy supplied and concomitantly varies the power output. Conversely, by maintaining the frequency of ignition of the thyristors constant, constant power is supplied to the weld without a complicated feedback control system.

The invention is not limited to the frequency converter illustrated and described, but may be used in conjunction with other frequency converters, for example frequency converters having forced commutation or d.c. controlled intermediate stages.

I claim:

1. An arc welding current supply providing power to welding electrodes comprising:
    a.c. to d.c. rectifier means for converting an a.c. source voltage to a d.c. source voltage;
    a controlled frequency d.c. to a.c. inverter means, connected to said rectifier means, for converting said d.c. source voltage into an a.c. voltage, said inverter operating with a half period which is less than the average duration of the current and voltage transients caused by short circuits through droplets of a welding material;
    a transformer having a primary winding connected in said inverter circuit and a secondary winding connected to said welding electrodes; and
    control device means for controlling said inverter in a manner such that the arc power of the welding arc remains substantially unchanged irrespective of changes in load caused by the welding operation;
    said inverter comprising first and second thyristors, at least one charge-discharge capacitor and said primary winding; said first thyristor, said at least one capacitor and said primary winding being connected in series and connected to said d.c. source voltage, whereby said at least one capacitor is charged during the conduction of said first thyristor; said second thyristor being connected in a circuit loop with said primary winding and said at least one capacitor, whereby said capacitor is discharged during the conduction of said second thyristor;
    said control device means comprising an open loop system including means for alternatingly igniting said first and second thyristors at said controlled frequency, the duration between the ignition and cutoff of each said thyritor being sufficient to completely charge and discharge said capacitor.

2. An arc welding current supply as claimed in claim 1 further comprising a rectifier connected in series between said transformer and the welding electrodes for providing d.c. current and voltage to welding electrodes.

3. An arc welding current supply as claimed in claim 2 wherein said control device means comprises:
    a voltage controlled oscillator for providing a pulse train output at a rate dependent upon a voltage input thereto;
    thyristor ignition circuitry for alternately igniting said first and second thyristors into their conducting states in response to triggering pulses applied thereto;
    gating means connected to said voltage controlled oscillator and said thyristor ignition circuitry for applying pulses in said pulse train output to said thyristor ignition circuitry.

4. An arc welding current supply as claimed in claim 2 wherein said control device means further comprises, a first blocking means connected between said thyristors and said gating means for blocking said gating means at all times other than when a reverse bias appears across the anode cathode path of either of said thyristors, whereby neither thyristor can be turned on until the previously conducting thyristor is turned off.

5. An arc welding current supply as claimed in claim 3 wherein said control device means further comprises, a second blocking means for blocking said gating means when the voltage to said welding electrodes exceeds a predetermined maximum.

6. An arc welding current supply as claimed in any of claims 1, 2, 3, 4 or 5 wherein said inverter further comprises a second capacitor; said second capacitor being connected in series with said primary coil and said second thyristor for charging said capacitor with voltage from said d.c. source when said second thyristor is conducting; said second capacitor being connected in a circuit loop with said primary coil and said first thyristor for discharging said capacitor when said first thyristor is conducting; said capacitor being fully charged and fully discharged during the alternate conduction of said second and first thyristors, respectively.

7. An arc welding current supply as claimed in claim 6 wherein said first and second thyristors are in series with one another and connected across said d.c. supply voltage, said one and second capacitors are in series with one another and connected across said d.c. supply voltage, and said primary winding is connected between the junction of said first and second thyristors and the junction of said first and second capacitors.

* * * * *

UNITED STATES PATENT AND TRADEMARK OFFICE
CERTIFICATE OF CORRECTION

PATENT NO.   :   4,382,171
DATED        :   May 3, 1983
INVENTOR(S)  :   John B. G. Hedberg It is certified that error appears in the above-identified patent and that said Letters Patent is hereby corrected as shown below:

Col. 3, line 12, "Q" should be "$\overline{Q}$";

Col. 4, line 33, "Q" should be "$\overline{Q}$";

Col. 4, line 58, "$T_4$" should be "$t_4$";

Col. 4, line 62, both occurrences of "$T_4$ to $T_5$" should be "$t_4$ to $t_5$"; and Col. 6, line 1, "thyritor" should be "thyristor".

Signed and Sealed this

Sixteenth Day of August 1983

[SEAL]

Attest:

Attesting Officer

GERALD J. MOSSINGHOFF

Commissioner of Patents and Trademarks